United States Patent
Huston, III et al.

(10) Patent No.: US 10,116,692 B2
(45) Date of Patent: Oct. 30, 2018

(54) SCALABLE DDOS PROTECTION OF SSL-ENCRYPTED SERVICES

(71) Applicant: Arbor Networks, Inc., Burlington, MA (US)

(72) Inventors: Lawrence B. Huston, III, Ann Arbor, MI (US); Scott Iekel-Johnson, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 285 days.

(21) Appl. No.: 14/846,403

(22) Filed: Sep. 4, 2015

(65) Prior Publication Data

US 2017/0070531 A1   Mar. 9, 2017

(51) Int. Cl.
   *H04L 29/06*   (2006.01)

(52) U.S. Cl.
   CPC ...... *H04L 63/1458* (2013.01); *H04L 63/0428* (2013.01); *H04L 63/1416* (2013.01)

(58) Field of Classification Search
   CPC ............. H04L 63/1458; H04L 63/1416; H04L 63/0428
   See application file for complete search history.

(56) References Cited

U.S. PATENT DOCUMENTS

| | | | |
|---|---|---|---|
| 6,088,804 A * | 7/2000 | Hill | G06F 21/552 726/25 |
| 7,665,135 B1 * | 2/2010 | Mohiuddin | H04L 63/0218 726/22 |
| 7,694,338 B1 * | 4/2010 | Jafari | H04L 63/1458 726/22 |
| 2005/0005017 A1 * | 1/2005 | Ptacek | H04L 63/1408 709/229 |
| 2005/0216956 A1 * | 9/2005 | Orr | H04L 63/0209 726/23 |
| 2006/0075491 A1 * | 4/2006 | Lyon | H04L 29/06027 726/22 |
| 2006/0282891 A1 * | 12/2006 | Pasko | H04L 63/1458 726/23 |
| 2009/0319773 A1 * | 12/2009 | Frenkel | G06F 21/50 713/153 |

(Continued)

*Primary Examiner* — Joseph P Hirl
*Assistant Examiner* — J. Brant Murphy
(74) *Attorney, Agent, or Firm* — Locke Lord LLP; Scott D. Wofsy; Christopher J. Capelli

(57) ABSTRACT

A system for mitigating network attacks within encrypted network traffic is provided. The system includes a protected network including a plurality of devices. The system further includes attack mitigation devices communicatively coupled to the protected network and to a cloud platform. The attack mitigation devices are configured and operable to decrypt the encrypted traffic received from the cloud platform and destined to the protected network to form a plurality of decrypted network packets and analyze the plurality of decrypted network to detect attacks. The attack mitigation devices are further configured to generate, in response to detecting the attacks, attack signatures corresponding to the detected attacks and configured to send the generated attack signatures to attack mitigation services provided in the cloud platform. The attack mitigation services are configured and operable to drop encrypted network traffic matching the attack signatures received from the attack mitigation devices.

9 Claims, 3 Drawing Sheets

(56) References Cited

U.S. PATENT DOCUMENTS

| | | | |
|---|---|---|---|
| 2010/0333116 A1* | 12/2010 | Prahlad | G06F 17/30082 719/328 |
| 2011/0283101 A1* | 11/2011 | Kolton | G06F 21/552 713/151 |
| 2013/0254879 A1* | 9/2013 | Chesla | H04L 63/1458 726/22 |
| 2013/0263256 A1* | 10/2013 | Dickinson | H04L 63/1416 726/22 |
| 2016/0021056 A1* | 1/2016 | Chesla | H04L 63/02 726/11 |

* cited by examiner

SCALABLE DDOS PROTECTION OF SSL-ENCRYPTED SERVICES

FIELD OF THE INVENTION

Embodiments of the present invention relate generally to computer networks, and specifically to scalable Distributed Denial of Service ("DDoS") protection of Secure Sockets Layer (SSL) encrypted services.

BACKGROUND OF THE INVENTION

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A DDoS attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

The encrypted DoS/DDoS are performed against servers having an encrypted connection with their clients. That is, the communication protocols utilized between servers and clients may include TLS, SSL, and the like. Encrypted DoS/DDoS attacks cannot be detected and mitigated by mere use of the conventional techniques for mitigating non-encrypted DoS/DDoS attacks. Specifically, current detection techniques typically use a dedicated SSL proxy or Web Application Firewall (WAF) device to decrypt the traffic. However, to decrypt network traffic such SSL proxy or WAF device typically needs to have the private keys and certificates for the domain being protected.

The architecture of a cloud platform makes networks and network devices vulnerable to the growing problems of DDoS attacks. If DDoS prevention service provider operates in a cloud-based environment and manages the private keys and certificates in the cloud, such an arrangement creates a potential data security risk for a service client. Therefore, the ability to securely avoid or mitigate large-scale encrypted DDoS attacks using cloud-based service, while preventing blocking of valid hosts is advantageous to devices located in a protected network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for mitigating network attacks within encrypted network traffic is provided. The system includes a protected network including a plurality of devices. The system further includes one or more attack mitigation devices communicatively coupled to the protected network and to a cloud platform. The attack mitigation devices are configured and operable to decrypt the encrypted traffic received from the cloud platform and destined to the protected network to form a plurality of decrypted network packets and analyze the plurality of decrypted network to detect one or more attacks. The attack mitigation devices are further configured to generate, in response to detecting the one or more attacks, one or more attack signatures corresponding to the one or more detected attacks and configured to send the generated attack signatures to one or more attack mitigation services provided in the cloud platform. The attack mitigation services are configured and operable to drop encrypted network traffic matching the attack signatures received from the attack mitigation devices.

In another aspect, an attack mitigation device communicatively coupled to a protected network and to a cloud platform is provided. The attack mitigation device includes logic integrated with and/or executable by a processor. The logic is adapted to decrypt encrypted network traffic received from the cloud platform and destined to the protected network to form a plurality of decrypted network packets. The logic is further adopted to analyze the plurality of decrypted network packets to detect one or more attacks. The logic is yet further adopted to generate, in response to detecting the one or more attacks, attack signatures corresponding to the detected attacks. Additionally, the logic is adopted to send the generated one or more attack signatures to one or more attack mitigation services in the cloud platform.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
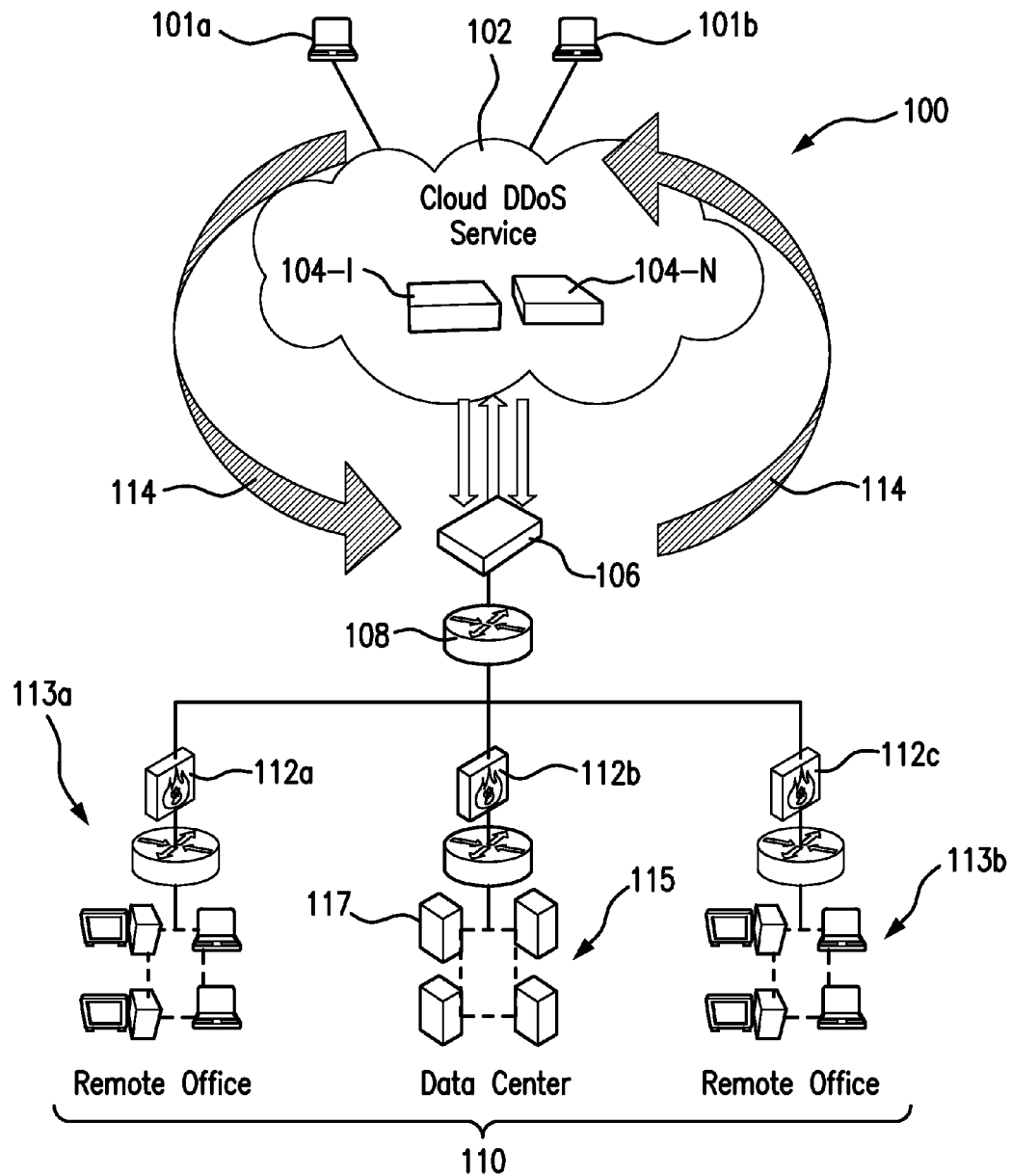
FIG. 1 is a schematic diagram showing network architecture and the relationship between the cloud service, attack mitigation device and protected network according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In accordance with an illustrated embodiment of the present invention, reference is now made to FIG. 1 which is an exemplary and non-limiting diagram illustrating a network architecture to which embodiments of the present invention are applicable. In the illustrated embodiment of FIG. 1, one or more external devices 101a, 101b communicate with a protected network 110 and specifically one or more devices within one of the remote offices 113a, 113b and/or a server within a data center 115. In the illustrated example, the external devices 101a, 101b may connect to a destination device using an application layer cryptographic protocol through a cloud-based DDoS service 102. The protected network 110 includes a plurality of devices/servers to be protected from malicious threats. The application layer cryptographic protocol includes, but is not limited to, SSL and TLS, and the like. The cloud-based DDOS service 102 includes a plurality of attack management devices 104-1 through 104-N. Each network element may be a networking switching element having logic integrated with and/or executable by a processor.

As shown in FIG. 1, the cloud-based DDoS service 102 is further connected to an attack mitigation computing device 106. It is to be understood and appreciated the cloud-based DDoS service 102 may be operable in a cloud-system infrastructure, while the attack mitigation computing device 106 typically resides at a customer's premises but could reside elsewhere. Generally, the cloud system infrastructure abstracts away physical servers, storage, networking, etc. and instead offers these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. Common shorthand for a provided cloud computing service (or even an aggregation of all existing cloud services) is "the cloud." The cloud-based DDoS service 102 is illustrated herein as one exemplary embodiment of a cloud based system. It is to be understood the cloud-based DDoS service 102 can be implemented as a private cloud, a public cloud, a hybrid cloud, and the like. It should be noted that although pairs of external devices 101a, 101b and remote offices 113a, 113b, and one data center 115 are depicted in FIG. 1 merely for the sake of simplicity, the embodiments disclosed herein can be applied to a plurality of external devices, protected remote offices, and datacenters.

In accordance with an illustrated embodiment of the present invention, the attack mitigation device 106 is configured to process traffic received from the cloud-based DDoS service 102 for the purpose of mitigating DoS and DDoS attacks, as well as other types of attacks such as intrusion attempts and malware distribution against the protected network 110. For example, the external device 101a may carry out the malicious attacks against the server 117, and particularly encrypted DoS and/or encrypted DDoS attacks (hereinafter "encrypted attack"). When the external device 101a launches a DDoS attack against an SSL protected server 117, the external device 101a first establishes an SSL-session with the server 117 before sending the malicious requests over the now-encrypted channel to the server 117. This means that traditional DDoS solutions can no longer inspect and analyze the traffic in order to identify and block the attack, because the content of the communication is encrypted. Conventional approaches have relied on an SSL proxy device to decrypt the traffic and make it available for inspection and mitigation, either by software running on the SSL proxy itself or by a device connected to the SSL proxy directly. However, the external device 101a may implement an attack tool that can be a dedicated tool for performing the encrypted attack or can be an infected device. Again, it should be noted that the embodiments disclosed herein are applied when multiple external devices exist, thus multiple attack tools may execute encrypted attacks against the server 117 within the protected data center 115. As discussed further below, decrypting traffic requires the decrypting device to have the private keys and certificates for the services being decrypted, or else to act as a full proxy and terminate the SSL sessions, or both. This is computationally expansive, which limits the amount of traffic and the size of the attack that can be defeated. Thus, the conventional DDoS protection solutions are ill-suited to mitigate large scale attacks. The DDoS protection solution involving a full SSL proxy is also intrusive, as it can affect latency and throughput of legitimate traffic.

Advantageously, the embodiments disclosed herein offer a novel approach that can detect and mitigate a large scale encrypted attack campaign where a vast number of attack tools participate in attacking the protected network 110, i.e., the server 117. As discussed further below, the attack mitigation device 106 is configured to decrypt and inspect data traffic received from the cloud-based DDoS service 102 and to drop traffic belonging to an attack. In a preferred embodiment, the attack mitigation device 106 is configured to detect DoS/DDoS attacks by determining if incoming traffic from cloud-based DDoS service 102 is suspected of including threats by monitoring traffic addressed to the destination device (i.e., server 117). The attack mitigation device 106 can be configured to detect DoS/DDoS attacks based on (but not limited to) network and bandwidth statistics, such as an average number of active connections, an average number of packets received per second, and other DoS/DDoS attack detection techniques known in the related art. According to an embodiment of the present invention, the attack mitigation device 106 is also configured and operable to identify and track various network information related to the attack including, but not limited to, IP addresses, TCP ports and other network information (i.e., layer 3 and/or layer 4 information), and utilizes cloud-signaling network protocols to push this information identifying attack sources (e.g., external device 101a) to the cloud-based DDoS mitigation service provided by attack management devices 104-1 located within the cloud-based DDoS service 102. It is to be understood and appreciated the cloud-based DDoS mitigation service is preferably configured and operable to identify and block malicious incoming traffic based on the received attack-related information without needing to decrypt the incoming encrypted traffic.

In an exemplary embodiment of the present invention, the cloud based attack mitigation service may be provided by an attack management device 104-1 configured and operable to provide a full suite of countermeasures that surgically removes DDoS attack traffic while enabling the flow of legitimate traffic—all without interrupting the network services. For example, the attack management device 104-a can be based on the Arbor® Networks Peakflow SP Threat Management System product.

According to exemplary configuration illustrated in FIG. 1, the attack mitigation device 106 may be communicatively coupled to a Client Edge (CE) device 108. The CE device 108 can provide entry points into the protected enterprise core network 110. Example edge devices can include routers, routing switches, integrated access devices (IADs), multiplexers, and a variety of metropolitan area network (MAN) and wide area network (WAN) access devices. The CE device 108 can be deployed inline in one of several modes. In one example, the CE device 108 can be deployed as a customer premises equipment (CPE) device in a branch that is capable of serving as a router. In some examples, the CE device 108 may comprise a gateway node. Generally, a gateway can be a network node equipped for interfacing with another network utilizing different communication protocols. In other words, the CE device 108 may serve, for example, as an aggregation point linking multiple remote offices 113a, 113b, data center 115 and/or other components of the protected enterprise network 110. As shown in FIG. 1, a plurality of firewall security devices 112a-112c ("firewall" for short) may be coupled between the CE device 108 and various portions (i.e., remote office 113, data center 115) of the protected enterprise network 110. The firewall devices 112a-112c may be configured to prevent unauthorized users from accessing various devices/computers (i.e. server 117) within the protected network 110.

In alternative configuration, the attack mitigation device 106 may comprise a virtual device. In yet another configuration, the attack mitigation device 106 may reside within the cloud platform 102. At least some of the embodiments do not require the attack mitigation device 106 to be a physical hardware device or to be located in a particular part of the network infrastructure, as long as the attack mitigation device 106 can be in the path of the incoming and outgoing traffic to and from the protected network 110 and as long as the attack mitigation device 106 as able to interact with a cloud-based DDoS mitigation solution upstream.

Figure 2:
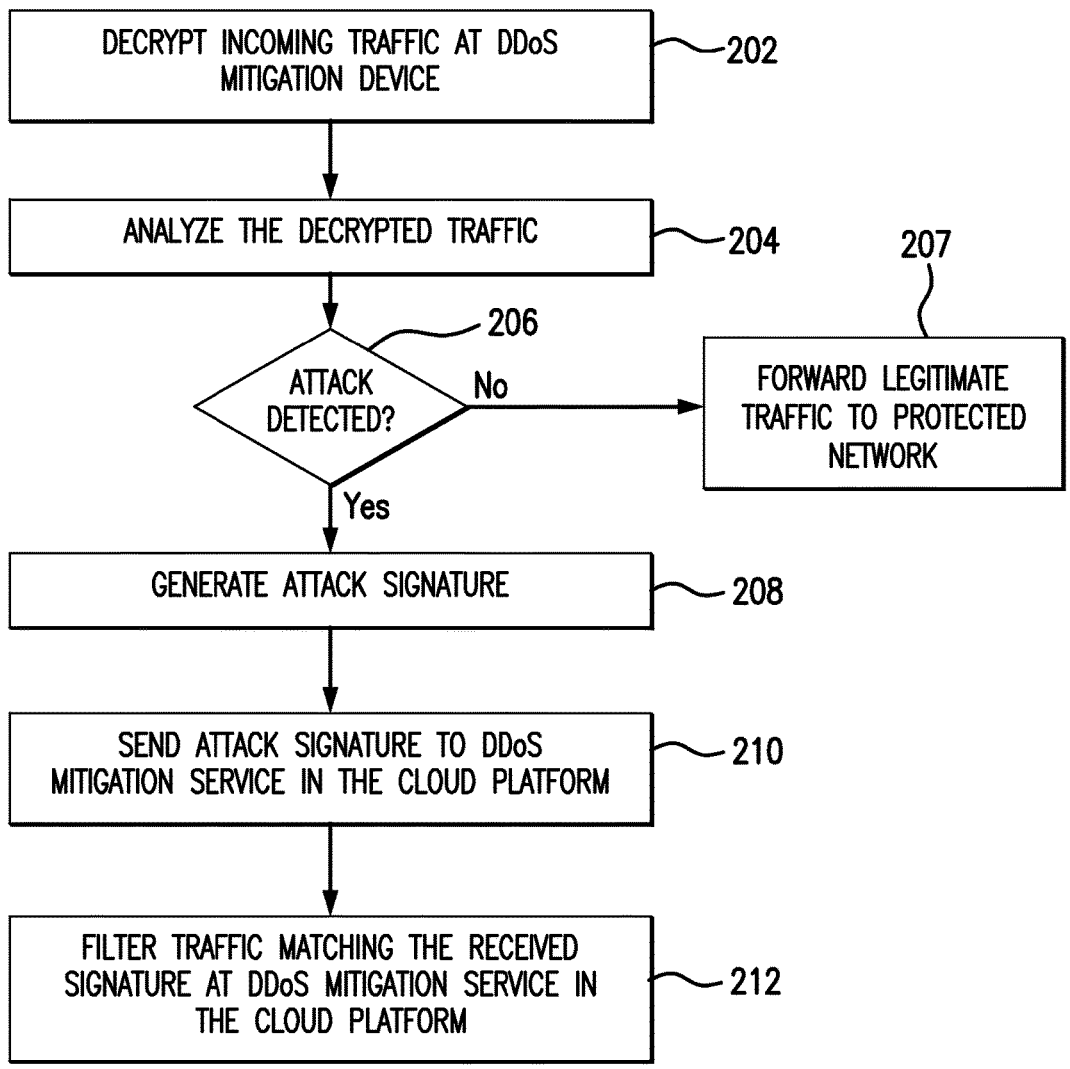
FIG. 2 is a flowchart illustrating a method in accordance with the illustrated embodiments.

FIG. 2 shows an exemplary and non-limiting flowchart illustrating a method for mitigating network attacks within encrypted network traffic in accordance with certain illustrated embodiments. Before turning to description of FIG. 2, it is noted that the flow diagram in FIG. 2 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, starting at step 202, encrypted traffic from cloud-based DDoS service 100 (routed to a destination device, i.e. server 117) is intercepted by the attack mitigation device 106. The encryption may be based for example on a customer-specified encryption solution using an external service, hardware or on-premises library or process. In another example, the attack mitigation device 106 may request and store encryption keys or identifiers from previously used encryption solution if this is information necessary to decrypt the network traffic later. The attack mitigation device 106 may, for example, use one of the plurality of encryption keys stored in the CE gateway device 108. Thus, in step 202, the attack mitigation device 106 may determine if the received plurality of network packets is encrypted in accordance with an encryption key of a plurality of stored encryption keys. In response to a determination that the received packets are encrypted with a stored encryption key the attack mitigation device 106 may decrypt the plurality of network packets using the stored encryption key.

Next, at step 204, the attack mitigation device 106 may analyze the plurality of decrypted network packets to make a determination if the inbound traffic is suspected of including threats based on network and bandwidth statistics. Such statistics may include an average number of active connections, an average number of packets received per second, and so on. In one embodiment, the attack mitigation device 106 can identify DDoS attacks at the network and transport layers (layers 3 and 4, i.e. TCP/IP). For example, the attack mitigation device 106 can be configured to detect DDoS attacks by identifying abnormal traffic behavior and/or known attack patterns at the network layer. As used herein, the DDoS attacks include, but are not limited to, packet anomaly attacks, internet protocol (IP) fragment floods, packet flood attacks performed by protocols including TCP, UDP, Internet Control Message Protocol (ICMP), and Internet Group Management Protocol (IGMP), TCP spoofed SYN attacks, TCP connection flood attacks, and other layers 3 and 4 DDoS attacks generated by known DoS attack tools.

In various embodiments, the attack mitigation device 106 can apply different detection actions on such types of DDoS attacks including, but not limited to, behavioral based analysis, TCP cookie mechanisms, rate limit engines, black lists, and the like. In other words, according to an embodiment of the present invention, the attack mitigation device 106 is responsible to differentiate between legitimate traffic and DDoS attack traffic using at least one or more of the above mentioned techniques. It should be noted that at least in some embodiments the incoming packets at network and transportation layers may not be encrypted in such communication layers for client L4 authentication.

According to an embodiment of the present invention, at step 206, the attack mitigation device 106 insects the results of the analysis performed in step 204 to determine whether one or more attacks or other malicious threats are detected or suspected. In response to finding no malicious attacks or threats (decision block 206, "no" branch), at step 207, the attack mitigation device 106 forwards legitimate clean traffic by means of the CE device 108 to the destination device (i.e., server 117). It is noted that in one embodiment, the attack mitigation device 106 may simply forward the original (still encrypted) packets to the CE device 108. In the alternative embodiment, the attack mitigation device 106 may re-encrypt the plurality of decrypted packets using the stored encryption key.

In response to detecting any abnormal traffic behavior (decision block 206, "yes" branch), the attack mitigation device 106 then takes an appropriate action to mitigate the particular malicious network activity (step 208). For example, the attack mitigation device 106 may null route the malicious network traffic, logically separate malicious network traffic, and/or take any other action that effectively eliminates the attack or threat. According to an embodiment of the present invention, at step 208, the attack mitigation device 106 may also generate an attack signature(s) based on the determined identifying characteristic(s) of the "attack" packets. It is noted that the generated attack signature may include attributes that relate to at least one of a network layer and transport layer. As used herein, the attack signature may include, but is not limited to, a source IP address, source or destination port, protocol, Time To Live (TTL) value, TCP header parameters or other layer 3 and 4 traffic related information.

Proceeding to step 210, the attack mitigation device 106 is then configured to send a cloud signaling message to a cloud-based DDoS mitigation service. The cloud signaling messages are able to carry information needed to identify malicious traffic. The operation of the cloud signaling message and attack mitigation device 106 is better understood with an example.

During the installation of attack mitigation devices 106, cloud signaling is configured. Configuring includes enabling a threshold for automatic signaling, and setting a threshold limit such as 5 Megabits per second (Mbps). In this example, the protected network connection has a bandwidth of 10 Mbps. If an attack of 20 Mbps is directed at the protected network 110, the attack mitigation device 106 detects the attack as being 10 Mbps, which is entire capacity of the protected network connection). The attack mitigation device 106 automatically signals a request for mitigation because 10 Mbps is larger than the 5 Mbps threshold. Additionally, in some embodiments, the attack fingerprint is also sent. This is done by adding the request and fingerprint to the next status message sent by the attack mitigation device 106 to the cloud-based DDoS service 102 with a message such as "cloud signaling requested at <date/time> for 10 Mbps attack."

In one exemplary embodiment, the attack mitigation device 106 automatically sends a cloud signaling message 114 to the one or more of the attack management devices 104-1, 104-N residing in the cloud platform (i.e., cloud-based DDoS service 102) instructing to drop attacker data traffic matching the identified characteristic(s) of the attack packets. According to one embodiment, information related to multiple attackers may be packed together into a single cloud signaling message 114 for efficiency purposes.

According to an embodiment of the present invention, in response to receiving the cloud signaling messages 114 containing information related to the attack, the cloud-based attack mitigation services provided by one or more attack management devices 104-1, 104-N may begin blocking any encrypted traffic coming from the threat based on the one or more received attack signatures (step 212). In various embodiments the cloud-based attack mitigation services may take any action that effectively eliminates the attack or threat. Advantageously, the cloud-based attack mitigation services are configured to block the malicious traffic without requiring further decryption. It is noted that by reducing the workload on the attack mitigation device 106 responsible for performing decryption of incoming traffic, the disclosed approach enables the blocking of substantially large DDoS attacks—much larger than could be blocked with the conventional SSL proxy approach where all mitigation actions are taken by the decrypting device, such as the attack mitigation device 106.

Figure 3:
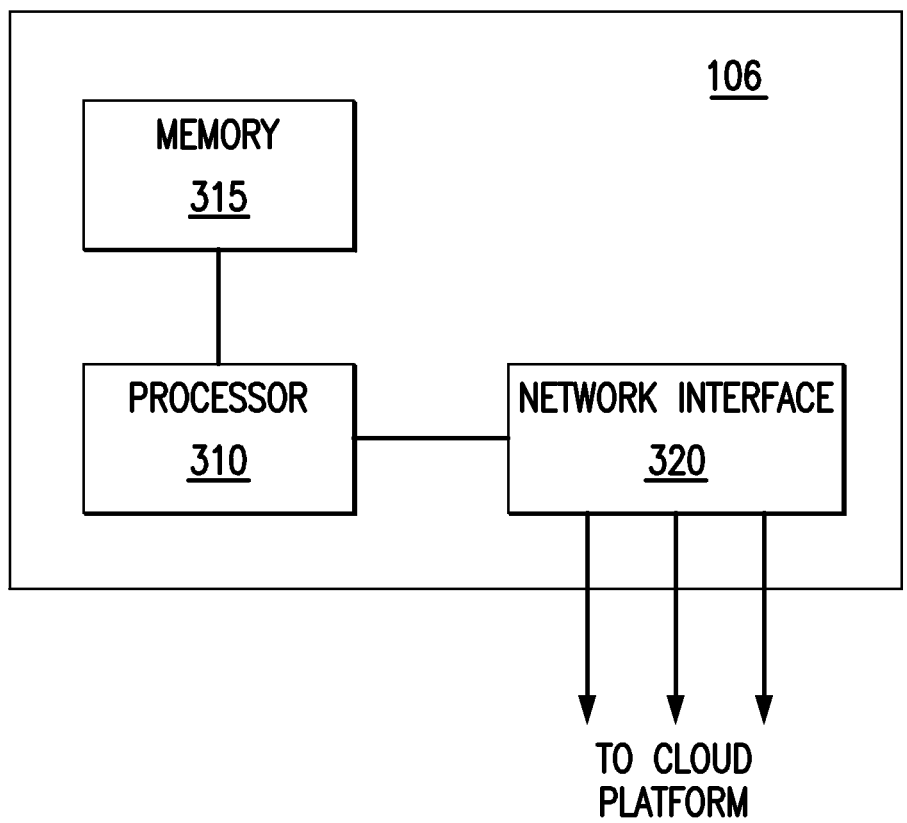
FIG. 3 is a block diagram of the attack mitigation device of FIG. 1.

With reference now to FIG. 3, illustrated is an exemplary and non-limiting block diagram of the attack mitigation device 106 constructed according to an illustrated embodiment. The attack mitigation device 106 is communicatively coupled to the protected network 110 and to the cloud platform 102, as shown in FIG. 1, and is at least configured to execute the method for mitigating network attacks within encrypted network traffic as described in greater detail above. The attack mitigation device 106 preferably includes a processor 310 coupled to a memory 315 and a network-interface module 320. The network-interface module 320 allows the communication with the cloud platform 102. In one embodiment, such communication with the cloud platform 102 uses the cloud signaling messaging discussed above. The processor 310 uses instructions stored in the memory 315 to execute network traffic decryption and attack detection tasks as well as to control and enable the operation of the network-interface module 320.

In summary, various embodiments of the present invention disclose a novel approach to avoid or mitigate large-scale encrypted DDoS attacks that provide a number of advantages. In one aspect, software programming code embodying the present invention provides an ability to improve the scale and performance of the DDoS mitigation solution by offloading the processing of large volumes of the attack traffic to the cloud-based mitigation service where the malicious traffic can be blocked more efficiently based on the layer 3 and 4 information identifying attack packets. In another aspect, using this approach, the attack mitigation device 106 is freed up to decrypt and inspect the remaining traffic without being overwhelmed. In other words, the attack mitigation device 106 needs to decrypt only legitimate network traffic and attack traffic that does not match the generated attack signature, as opposed to conventional technologies that require the decryption of entire incoming network traffic. In yet another aspect the cloud mitigation service provided by one or more devices 104 residing within the cloud infrastructure 102 can deploy a faster and more scalable DDoS mitigation solution than could be deployed in front or within of the protected network 110, making it cost effective in large scale. In one embodiment, the above described approach utilizing cloud signaling communication mechanism allows a large, scalable cloud-based DDoS mitigation service to effectively protect a plurality of devices included in the protected enterprise network 110 from DDoS attacks and other advanced threats such as, but not limited to, intrusion attempts, malware distribution, and the like. Additionally, as yet another benefit of the disclosed embodiments, responsibility for managing the encryption keys and certificates (which are subject to complying with significant privacy, security and regulatory requirements) can be segregated from the responsibility for mitigating and preventing DDoS attacks. In other words, as shown in FIG. 1, the attack mitigation device 106 may reside on premise with the protected enterprise network 110, but the DDoS protection operation can be performed by the cloud-based DDoS service provider, including remote management of the DDoS mitigation of the on premise attack mitigation device 106.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for mitigating network attacks within encrypted network traffic, the system comprising:
   a cloud based Distributed Denial of Service (DDoS) mitigation service having a plurality of attack management devices;
   one or more attack mitigation devices communicatively coupled to a protected network and to the cloud based DDoS mitigation service, wherein the one or more attack mitigation devices are configured and operable to decrypt the encrypted network traffic received from the DDoS mitigation service and destined to the protected network to form a plurality of decrypted network packets, analyze the plurality of decrypted network packets to detect one or more attacks by determining which decrypted network packets are associated with network attacks, generate, in response to detecting the one or more attacks, one or more attack signatures corresponding to the one or more detected attacks and send the generated one or more attack signatures to the one or more attack management devices utilizing cloud-signaling network protocols to push the attack signatures to the plurality of cloud based attack management devices wherein the one or more attack mitigation devices are further configured and operable to re-encrypt only decrypted network packets not associated with the one or more detected network attacks and to send the re-encrypted packets to the protected network; and wherein the one or more attack management devices are configured and operable to block encrypted network traffic matching the one or more attack signatures from reaching the protected network without needing to decrypt incoming encrypted traffic received from one or more external devices.

2. The system as recited in claim 1, further comprising a Client Edge (CE) router device communicatively coupled to the one or more attack mitigation devices, the CE router device configured and operable to route the encrypted network traffic from the one or more attack mitigation devices to the protected network.

3. The system as recited in claim 1, wherein the one or more attack signatures are sent from the one or more attack mitigation devices to the cloud platform using one or more cloud signaling messages.

4. The system as recited in claim 1, wherein the encrypted network traffic comprises a Secure Socket Layer (SSL) traffic and wherein the one or more attack mitigation devices decrypt the SSL traffic using a private key and a certificate stored by the one or more attack mitigation devices.

5. The system as recited in claim 1, wherein the one or more attack mitigation devices are further configured and operable to drop one or more decrypted network packets associated with the one or more detected network attacks.

6. The system as recited in claim 1, wherein the generated one or more signatures comprise attributes that relate to at least one of a network layer and a transport layer.

7. The system as recited in claim 6, wherein the attributes comprise at least one of a source IP address, source port, destination port, protocol and Time To Live (TTL) value.

8. The system as recited in claim 1, wherein the one or more attacks comprise at least distributed denial of service attack.

9. The system as recited in claim 1, wherein the one or more attack mitigation devices reside within the cloud platform.

* * * * *